May 16, 1944.　　　E. REICHHELM　　　2,348,925
LIQUID FILTER
Filed Oct. 10, 1942

INVENTOR
Edward Reichhelm
BY
S. C. Yeaton
ATTORNEY

Patented May 16, 1944

2,348,925

UNITED STATES PATENT OFFICE 2,348,925

LIQUID FILTER

Edward Reichhelm, Old Greenwich, Conn., assignor to American Locomotive Company, New York, N. Y., a corporation of New York Application October 10, 1942, Serial No. 461,543

3 Claims. (Cl. 210—131)

This invention relates to liquid filters, and more particularly to a filter for an oil pipe line or conduit employed in the transportation of crude oil or finished petroleum products.

A filtering appliance for an oil transportation pipe line or similar purpose must necessarily be a large heavy structure, containing a large amount of filtering material, and having a large output. It must therefore have characteristics not required in smaller filters, and it is these characteristics which are involved in the present invention, as set forth in the following description. For instance, the filtering device, i. e., the basket of filtering material, sometimes called cartridge, should be easily removable from the shell of the filtering appliance, so that it may be recharged or replaced by a reserve one. As this cartridge, when it is soaked with oil, is very heavy, means should be provided for supporting it during its withdrawal, and precaution should be taken so that sparks are not caused during removal or replacement which could ignite vapor from the oil. As a large amount of filtering material is required, the appliance should be adapted for use with a type of filtering material which can be obtained in large quantities at a low cost. The appliance shell is preferably cylindrical and of a large diameter, and the inside diameter of the open end of the shell must be unobstructed so that the cartridge may pass therethrough. Also a cover should be provided which can be easily and quickly removed and which is secured to the shell sufficiently strongly to resist the pressure of the oil in the shell.

An object of the present invention is to provide a liquid filtering appliance including a filter device which may be easily recharged with filtering material without disassemblage of the appliance from the line to which it is connected, the appliance having a chamber for collecting filtrate.

A further object of the invention is to provide a filtering appliance having a filter device and a pipe line scraper trap.

A further object is to provide a filtering appliance having a filter device employing a coarse filtering material, and a conduit for filtrate covered by felt or other suitable material through which filtrate must pass, thereby giving a secondary or polishing filtering to the initial filtrate.

Other and further objects of this invention will appear from the following description, the accompanying drawing and the appended claims.

Figure 1:
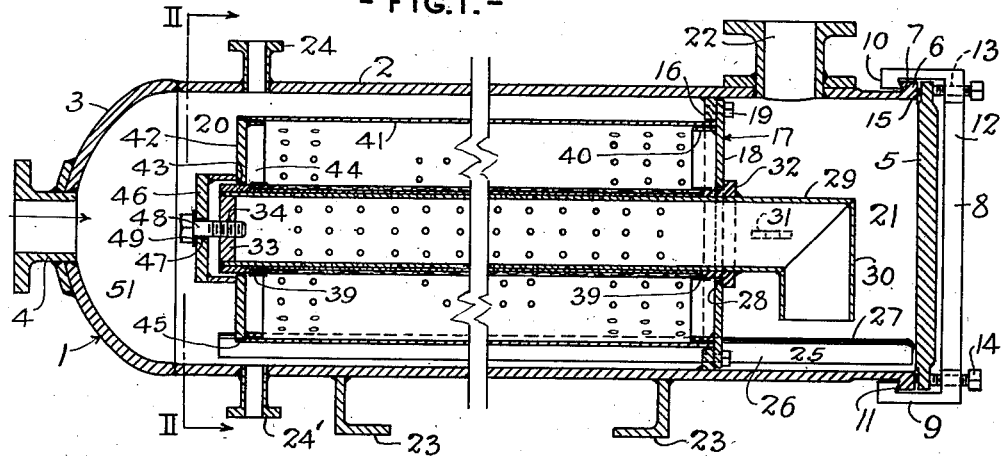
Figure 2:
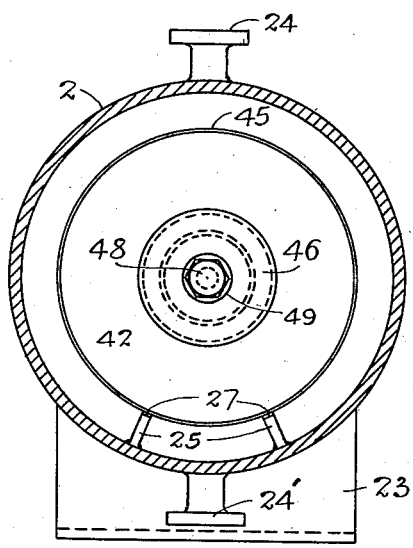
Figure 3:
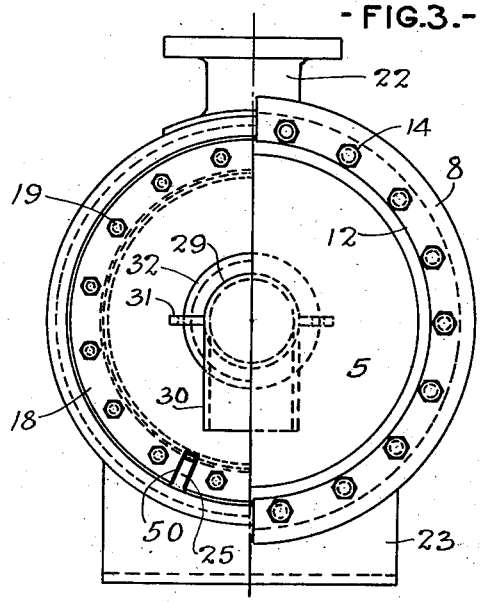
Figure 4:
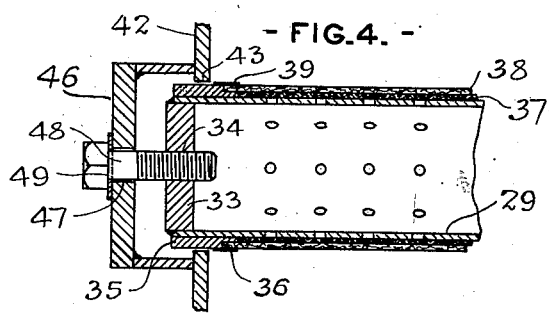

Referring to the drawing showing a preferred embodiment of the invention, Figure 1 is a foreshortened vertical longitudinal sectional view of the filtering appliance of the present invention, parts being shown in full; Fig. 2 is an enlarged transverse section of the filtering appliance taken on the line II—II of Fig. 1; Fig. 3, at the right, is an enlarged end view of the filtering appliance as viewed from the right of Fig. 1, and at the left, is a similar view with the cover and clamping means removed; and Fig. 4 is an enlarged view of a portion of the structure shown in Fig. 1.

The filtering appliance is indicated generally in the drawing by the reference numeral 1. It includes an outer shell 2, generally cylindrical in shape, and including, and being permanently closed at the rear end by, a curved cap 3 provided with an inlet nozzle 4. The front end is closed by a removable cover 5. The front end of the shell 2 is provided with an integral external flange 6 having a hook-shaped rear face 7. Two half rings or clamps 8, each provided with a rearwardly extending wall 9 at the rear end of which is an inwardly extending flange 10 having a forward hook-shaped face 11 adapted to coact with the hook-shaped face 7, are disposed over the cover 5 for securing the cover to the shell 2. Each half ring 8 further has a forward inwardly extending flange 12 containing threaded orifices 13 through which set screws 14 are threaded. The screws 14 bear against the forward face of the cover 5, pressing it tightly against a gasket 15 disposed between the cover and shell 2. The half rings 8 provide a simple detachable clamping means for strongly securing the cover 5 to the shell 2. They have the further advantage that they eliminate the necessity of bolting flanges on the shell and cover, these flanges being difficult to calculate in a pressure vessel of the diameter of a transportation oil pipe line filtering appliance.

A flange 16 extends inwardly from the wall of the shell 2 a short distance from the cover 5. A filter device, indicated generally by the reference numeral 17, is disposed in the shell 2. It has a forward wall 18 secured to the flange 16 by bolts 19, the bolts extending through orifices in wall 18 and being threaded in orifices in flange 16, wall 18 dividing the shell 2 into a rear compartment 20 for unfiltered oil, and a forward compartment 21 for collecting filtered oil (filtrate). During operation of the appliance the compartments will be full of oil as oil enters the appliance under pressure. An outlet nozzle 22 opens into compartment 21. The appliance is shown in Fig. 1 disposed horizontally with the outlet 22 extending from a side wall of the shell vertically upwardly therefrom, this being a preferred position of the appliance, although with suitable minor changes it can be employed in a vertical position. A base 23 is secured to the bottom part of the shell. Nozzles 24 and 24' open into compartment 20 at the vertical center line thereof at both the top and bottom of the shell, the top nozzle 24 being a vent and the bottom nozzle 24' being a drain.

Two tracks 25 are welded to the inner part of the shell 2. They extend from the cover 5 nearly to the cap 3 and are each in two pieces, there being a piece forward of flange 16 and a piece to the rear of flange 16. Each track includes an iron base 26 welded to the shell and a top surface strip 27 which may be of brass or other non-sparking material. This strip 27 may be secured to the base 26 by countersunk screws (not shown). Strip 27 is preferably continuous, being secured to both pieces of the track. The tracks are slightly higher than the flange 16. The forward end of the base 26 is curved and the strip 27 extends over the curve sufficiently to shield the forward end of the track. The tracks provide a simple means of supporting the filter device, especially during assemblage and disassemblage. However, other means may be provided in place of tracks, for instance rollers. Should the appliance be disposed verticaly, the tracks could be dispensed with. While only the tops of the tracks have been protected by brass strips, it is contemplated that other parts can be similarly protected where necessary.

The wall 18 has a central orifice 28 through which extends an inner shell or conduit 29. Shell 29 may be a cylindrical thin-walled pipe having its major portion perforated and disposed in compartment 20 and a smaller unperforated portion disposed in compartment 21. At its forward end in compartment 21 it has a right angle elbow 30 directed vertically downward for a purpose presently to appear. Horizontal orificed lugs 31 are secured to the exterior wall of the forward end of shell 29. They are for employment in removing the filter device from the shell 2. A flange 32 is secured to the outer wall of shell 29. It has a portion adjacent the forward side of wall 18 providing a shoulder or stop for removably engaging the same, and a sleeve-like portion extending through orifice 28.

The rear end of shell 29 is closed by a plate 33 disposed internally therein and provided with a threaded central orifice 34. Plate 33 is welded to shell 29 and a metal ring 35 is welded to the outer face of shell 29 adjacent plate 33 and extends forwardly therefrom, the forward end being provided with a shoulder 36. A wire screen 37 surrounds the portion of shell 29 between the inner ends of flange 32 and ring 35 and a cover 38, of dense felt or similar material, surrounds the wire screen 37 and extends rearwardly therefrom into the shoulder 36. Two metal retainer rings 39, secured respectively one to flange 32 and the other to ring 35, as by welding, extend over the front and rear edges of cover 38. Cover 38 is shown in the drawing as a one-piece sock. However, it may be wrapped around the screen 37 is desired, and the edges sealed by any suitable type of sealing strip.

A rearwardly extending annular flange 40 is secured to the wall 18 adjacent but spaced from the flange 16. An outer perforated shell 41 (all perforations not being shown in the drawing, for simplicity), disposed in compartment 20, is removably supported at its forward end by flange 40 and extends rearwardly almost to the plate 33.

The rear end of shell 41 is closed by a wall 42 having a central orifice 43 and a forwardly extending flange 44 similar to and in line with flange 40. A ring 45 of brass or similar non-sparking material is secured to the peripheral edge of wall 42 as by tap screws (not shown) and the rear edge of shell 41 removably engages the ring 45. Shell 29 extends through orifice 43 and wall 42 is disposed around ring 35. The space between shells 29 and 41 is for the filtering material (not shown).

A yoke or cap 46 having a central orifice 47 is disposed at the rearward side of wall 42 over orifice 43 and bearing against wall 42 at the margin of orifice 43. Cap 46 is in spaced relation with the rear end of shell 29. A bolt 48 having its head and a washer 49 bearing against the rear face of cap 46 extends through orifice 47 and is threaded into orifice 34. By tightening bolt 48, cap 46 is caused to bear against wall 42, forcing shell 41 tightly into engagement with wall 18 and ring 45, and flange 32 is drawn into tight engagement with wall 18 as bolt 48 draws shell 29 rearwardly. Flange 32 seals orifice 28 and cap 46 seals orifice 43. From the aforegoing description it will be seen that the filter device 17 is a knockdown structure with only bolt 48 holding the parts together.

The filter device 17 is supported on the tracks 25, wall 18 having grooves 50 coacting with the portion of tracks 25 in compartment 21. Grooves 50 and tracks 25 serve to center the filter device 17 so that the bolt orifices in wall 18 will align with the orifices in flange 16. The strips 27 and ring 45 prevent sparking due to the frictional scraping of the filter device 17 as it is pushed into shell 2 or removed therefrom.

The rear end of device 17 is spaced from nozzle 4 a sufficient distance to provide a chamber 51 at the rear end of the shell 2, this chamber forming a pipe scraper trap. That is to say, it is contemplated that appliance 2 will be secured to a pipe line and that nozzle 4 will be connected to the pipe line and that its inside diameter will be at least as large as the inside diameter of the pipe line connected thereto so that a pipe scraper passing through the pipe line may pass through nozzle 4 and fall into chamber 51 where it may be removed when the filter device 17 is removed. A pipe scraper is a conventional device adapted to be forced through a pipe line by the pressure of the oil being conducted therethrough and adapted to scrape off from the inside of the pipe any foreign material adhering thereto.

The appliances may be installed in any position, vertical or horizontal, as shown. Where used with a pipe line, it may be installed in a gap in the pipe line or at the end thereof. It may also be shunt-connected to the pipe line in which latter case a part of the pipe line across the shunt will be closed, as by a valve.

The filtering operation of the appliance is as follows: Oil from the pipe line enters the appliance through nozlze 4 and fills compartment 20 around shell 41. The oil passes into shell 41 through the perforations therein. Shell 41 is filled with a coarse filtering material (not shown) such as wood shavings, hay, straw or the like, this material being closely packed between shells 29 and 41. Thus shell 41 forms a basket or a baffle for the filtering material, and shell 29 forms another baffle. The only outlet from shell 41 is through shell 29 and therefore the oil passes to shell 29, being given a coarse filtering by the hay or other material, rust, scale and water being removed. Thus when the oil reaches the dense felt cover 38 it has already been partially filtered. It passes through the felt cover 38, being given a fine filtering or polishing. Screen 37 acts as a spacer between the felt cover 38 and shell 29 so that the oil passing through felt cover 38 can form a film entirely around shell 29 and have free access to the perforations therein. Thus the oil enters shell 29, passes forwardly therethrough and out of elbow 30, being directed downwardly into compartment 21 from which it passes by means of nozzle 22. Nozzle 22 may be connected to another part of the pipe line or any other suitable apparatus, such as, for instance, a meter for determining the displacement of oil through the pipe line.

Elbow 30 is directed vertically downwardly in compartment 21 to provide maximum agitation therein so that there will be no portion of compartment 21 from which oil does not flow to nozzle 22.

Shell 41 is spaced around its entire circumference from shell 2. As oil enters the appliance from the pipe line, a large amount of the solids therein precipitate, falling to and collecting in the bottom of the shell 2 beneath the shell 41, from which place they are removed when the filtering device is removed from the shell 2 during recharging. Thus much of the undesirable solids in the transported oil are disposed of by the appliance without the necessity of being filtered.

If the appliance is used for some other purpose than for filtering oil being transported in a pipe line a scraper trap will not be necessary; also if the fine filtering or polishing of the filtered oil is not necessary then the felt cover 38 and wire screen 37 will not be necessary.

An important advantage of the instant filtering appliance is the ease with which it may be recharged and cleaned with a minimum loss of time. When it is desired to recharge the appliance, the flow of liquid therethrough will be discontinued. All that is required in order to remove the filter device from the shell 2 is to loosen the screws 14 sufficiently to slip the half rings 8 off the shell, whereupon the cover 5 is free for removal, and then to remove the bolts 19. The filter device may then be pulled out of the shell by means of hooks (not shown) connected to the lugs 31, the device sliding on the tracks 25.

If a spare device is available, it may be slipped into the shell, secured to the flange 16 and the cover 5 secured in place, all with a minimum loss of time. If no spare device is available, and the transportation of oil through the pipe line must be held up during recharging, nevertheless the instant appliance affords the advantage of simple, quick recharging with a minimum loss of time for this operation. In such a case, after the device has been withdrawn from the shell for recharging, it is only necessary to remove the single bolt 48 in order to completely disassemble the parts of the device. As shells 29 and 41 can be separated by longitudinal relative movement, and as both wall 18 and wall 42 can be separated from the shells, the filtering material in shell 41 can be quickly pushed out, the removal of shell 29 from the interior of shell 41 providing ample room for loosening the filtering material for removal.

When it is desired to fill shell 41 with new filtering material, shell 29 is first inserted in shell 41 with wall 18 in place, forming a receptacle for the filtering material open at one end through which the material may be stuffed and packed. This knock-down construction avoids the difficulty, common to conventional filters, of removing old filtering material full of solids filtered from the oil, iron oxides, and heavy oil, all of which tends to pack the filtering material into a mass very difficult to break apart for removal.

While there has been hereinbefore described an approved embodiment of this invention, it will be understood that many and various changes and modifications in form, arrangements of parts and details of construction thereof may be made without departing from the spirit of the invention and that all such changes and modifications as fall within the scope of the appended claims are contemplated as a part of this invention.

The invention claimed and desired to be secured by Letters Patent is:

1. An appliance adapted for connection with a liquid-conveying conduit for filtering said liquid, said appliance comprising an outer shell; a filter device in said shell having an end well transversely partitioning said shell into two compartments, one of said compartments being for unfiltered liquid and having an inlet orifice for connection to said conduit, said device being removably housed in said unfiltered liquid compartment, the other of said compartments being for filtered liquid and being provided with an outlet orifice for filtered liquid in the side wall of said shell and being open at its outer end for the passage of said device therethrough, said device having an outlet conduit opening downwardly into said filtered liquid compartment providing an inlet for said filtered liquid compartment disposed at a point below said filtered liquid component outlet orifice; and a detachable cover for said open end.

2. An appliance adapted for connection with a liquid-conveying conduit for filtering said liquid, said appliance comprising an outer horizontally disposed shell; a filter device in said shell having an end wall transversely partitioning said shell into two compartments, one of said compartments being for unfiltered liquid and having an inlet orifice for connection to said conduit, said device being removably housed in said unfiltered liquid compartment, the other of said compartments being for filtered liquid and being provided with an outlet orifice for filtered liquid in the side wall of said shell and being open at its outer end for the passage of said device therethrough, said device having an outlet to said filtered liquid compartment; track means extending longitudinally of and secured to said shell supporting said device for sliding movement upon said track means longitudinally of said shell in registering alignment with the opening at said open end; and a detachable cover for said open end.

3. A liquid filtering appliance comprising an outer shell having an inlet for liquid to be filtered; and a filtering device housed in said shell, said device having a perforated outer shell and a perforated inner shell housed within said perforated outer shell for filtered liquid providing a space between said perforated shells for a charge of filtering material, said inner perforated shell being open at one end and having a wall closing the opposite end, said outer perforated shell having end walls, at least one of which being removable for recharging said space and freely bearing against the outer perforated shell wall end adjacent thereto, one of said outer perforated shell end walls being provided with an opening through which said inner perforated shell open end projects, said inner perforated shell having a shoulder exterior of and bearing against said outer perforated shell open end wall, the other of said outer perforated shell end walls having an opening adjacent said inner perforated shell-closing wall, said device further having a member exterior of said outer perforated shell other end wall and seating thereupon at opposite sides of said closing wall and having a part crossing said closing wall, and a bolt extending through said part and into said closing wall for securing said removable end wall to its said adjacent outer perforated shell wall end and for securing said inner perforated shell to said outer perforated shell.

EDWARD REICHHELM.